(12) United States Patent
Michel et al.

(10) Patent No.: US 8,457,676 B2
(45) Date of Patent: Jun. 4, 2013

(54) POWER HEADROOM REPORTING METHOD

(75) Inventors: Juergen Michel, München (DE); Klaus Ingemann Pedersen, Aalborg (DK); Claudio Rosa, Randers (DK)

(73) Assignee: Nokia Siemens Networks Oy, Espoo (FI)

( * ) Notice: Subject to any disclaimer, the term of this patent is extended or adjusted under 35 U.S.C. 154(b) by 396 days.

(21) Appl. No.: 12/665,427

(22) PCT Filed: Jun. 23, 2008

(86) PCT No.: PCT/FI2008/050384
§ 371 (c)(1),
(2), (4) Date: Jan. 22, 2010

(87) PCT Pub. No.: WO2008/155469
PCT Pub. Date: Dec. 24, 2008

(65) Prior Publication Data
US 2010/0173665 A1 Jul. 8, 2010

Related U.S. Application Data

(60) Provisional application No. 60/936,649, filed on Jun. 20, 2007.

(51) Int. Cl.
*H04B 7/00* (2006.01)
(52) U.S. Cl.
USPC .............................. 455/522; 455/68; 455/69

(58) Field of Classification Search
USPC .............. 455/522, 67.11, 68–70, 115.3, 126, 455/127.1, 127.2, 135, 226.3, 277.2, 296; 370/318
See application file for complete search history.

(56) References Cited

U.S. PATENT DOCUMENTS

| | | | |
|---|---|---|---|
| 5,914,950 A * | 6/1999 | Tiedemann et al. | 370/348 |
| 7,558,535 B2 * | 7/2009 | Cho et al. | 455/69 |
| 2003/0026324 A1 | 2/2003 | Li et al. | |
| 2004/0252658 A1 * | 12/2004 | Hosein et al. | 370/328 |
| 2007/0015476 A1 * | 1/2007 | Akbar Attar et al. | 455/127.1 |
| 2007/0097962 A1 * | 5/2007 | Yoon et al. | 370/352 |
| 2007/0270175 A1 * | 11/2007 | Malladi et al. | 455/522 |

(Continued)

FOREIGN PATENT DOCUMENTS

| | | |
|---|---|---|
| EP | 1 311 076 A1 | 5/2003 |
| EP | 1 628 413 A2 | 2/2006 |
| WO | WO 00/03499 | 1/2000 |
| WO | WO 00/62441 | 10/2000 |

OTHER PUBLICATIONS

3GPP TS 36.300 V8.0.0 (Mar. 2007); 3$^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 8).

*Primary Examiner* — Dominic E Rego
(74) *Attorney, Agent, or Firm* — Harrington & Smith

(57) ABSTRACT

A method, user equipment, network device, and software product enable a user equipment to determine that at least one of several triggering criterion have been met, in which case the user equipment provides a power control headroom report on an uplink from the user equipment. The triggering criterion includes a threshold having been reached, and the threshold is adjustable via a signal to the user equipment from a base station (such as an eNodeB).

35 Claims, 4 Drawing Sheets

U.S. PATENT DOCUMENTS

| | | | |
|---|---|---|---|
| 2008/0233992 A1* | 9/2008 | Oteri et al. | 455/522 |
| 2008/0240013 A1* | 10/2008 | Johnson et al. | 370/315 |
| 2008/0247358 A1* | 10/2008 | Damnjanovic et al. | 370/329 |
| 2008/0259833 A1* | 10/2008 | Ozturk et al. | 370/310 |
| 2009/0034479 A1* | 2/2009 | Wakayama et al. | 370/332 |
| 2010/0029212 A1* | 2/2010 | Malladi et al. | 455/63.1 |
| 2010/0046481 A1* | 2/2010 | Chen et al. | 370/335 |

* cited by examiner

POWER HEADROOM REPORTING METHOD

CROSS-REFERENCE TO RELATED APPLICATIONS

This application claims the benefit of Provisional Application No. 60/936,649, filed Jun. 20, 2007, the disclosure of which is incorporated herein by reference in its entirety.

FIELD OF THE INVENTION

The invention relates to the field of wireless telecommunications. More particularly, the present invention pertains to power control.

BACKGROUND OF THE INVENTION

The telecommunications industry is in the process of developing a new generation of flexible and affordable communications that includes high-speed access while also supporting broadband services. Many features of the third generation (3G) mobile telecommunications system have already been established, but many other features have yet to be perfected. The Third Generation Partnership Project (3GPP) has been pivotal in these developments.

One of the systems within the third generation of mobile communications is the Universal Mobile Telecommunications System (UMTS) which delivers voice, data, multimedia, and wideband information to stationary as well as mobile customers. UMTS is designed to accommodate increased system capacity and data capability. Efficient use of the electromagnetic spectrum is vital in UMTS. It is known that spectrum efficiency can be attained using frequency division duplex (FDD) or using time division duplex (TDD) schemes. Space division duplex (SDD) is a third duplex transmission method used for wireless telecommunications.

As can be seen in FIG. 1, the UMTS architecture consists of user equipment 102 (UE), the UMTS Terrestrial Radio Access Network 104 (UTRAN), and the Core Network 126 (CN). The air interface between the UTRAN and the UE is called Uu, and the interface between the UTRAN and the Core Network is called Iu.

High-Speed Downlink Packet Access (HSDPA) and High-Speed Uplink Packet Access (HSUPA) are further 3G mobile telephony protocols in the High-Speed Packet Access (HSPA) family. They provide a smooth evolutionary path for UMTS-based networks allowing for higher data transfer speeds.

Evolved UTRAN (EUTRAN) is a more recent project than HSPA, and is meant to take 3G even farther into the future. EUTRAN is designed to improve the UMTS mobile phone standard in order to cope with various anticipated requirements. EUTRAN is frequently indicated by the term Long Term Evolution (LTE), and is also associated with terms like System Architecture Evolution (SAE). One target of EUTRAN is to enable all internet protocol (IP) systems to efficiently transmit IP data. The system will have only use a PS (packet switched) domain for voice and data calls, i.e. the system will contain Voice Over Internet Protocol (VoIP).

Information about LTE can be found in 3GPP TS 36.300 (V8.0.0, March 2007), *Evolved Universal Terrestrial Radio Access (E-UTRA) and Evolved Universal Terrestrial Radio Access Network (E-UTRAN)—Overall description; Stage 2 (Release* 8), which is incorporated herein by reference in its entirety. UTRAN and EUTRAN will now be described in some further detail, although it is to be understood that especially E-UTRAN is evolving over time.

The UTRAN consists of a set of Radio Network Subsystems 128 (RNS), each of which has geographic coverage of a number of cells 110 (C), as can be seen in FIG. 1. The interface between the subsystems is called Iur. Each Radio Network Subsystem 128 (RNS) includes a Radio Network Controller 112 (RNC) and at least one Node B 114, each Node B having geographic coverage of at least one cell 110. As can be seen from FIG. 1, the interface between an RNC 112 and a Node B 114 is called Iub, and the Iub is hard-wired rather than being an air interface. For any Node B 114 there is only one RNC 112. A Node B 114 is responsible for radio transmission and reception to and from the UE 102 (Node B antennas can typically be seen atop towers or preferably at less visible locations). The RNC 112 has overall control of the logical resources of each Node B 114 within the RNS 128, and the RNC 112 is also responsible for handover decisions which entail switching a call from one cell to another or between radio channels in the same cell.

In UMTS radio networks, a UE can support multiple applications of different qualities of service running simultaneously. In the MAC layer, multiple logical channels can be multiplexed to a single transport channel. The transport channel can define how traffic from logical channels is processed and sent to the physical layer. The basic data unit exchanged between MAC and physical layer is called the Transport Block (TB). It is composed of an RLC PDU and a MAC header. During a period of time called the transmission time interval (TTI), several transport blocks and some other parameters are delivered to the physical layer.

Generally speaking, a prefix of the letter "E" in upper or lower case signifies the Long Term Evolution (LTE). The E-UTRAN consists of eNBs (E-UTRAN Node B), providing the E-UTRA user plane (RLC/MAC/PHY) and control plane (RRC) protocol terminations towards the UE. The eNBs interface to the access gateway (aGW) via the S1, and are inter-connected via the X2.

An example of the E-UTRAN architecture is illustrated in FIG. 2. This example of E-UTRAN consists of eNBs, providing the E-UTRA user plane (RLC/MAC/PHY) and control plane (RRC) protocol terminations towards the UE. The eNBs are connected by means of the S1 interface to the EPC (evolved packet core), which is made out of Mobility Management Entities (MMEs) and/or gateways such as an access gateway (aGW). The S1 interface supports a many-to-many relation between MMEs and eNBs. Packet Data Convergence Protocol (PDCP) is located in an eNB.

In this example there exists an X2 interface between the eNBs that need to communicate with each other. For exceptional cases (e.g. inter-PLMN handover), LTE_ACTIVE inter-eNB mobility is supported by means of MME relocation via the S1 interface.

The eNB may host functions such as radio resource management (radio bearer control, radio admission control, connection mobility control, dynamic allocation of resources to UEs in both uplink and downlink), selection of a mobility management entity (MME) at UE attachment, scheduling and transmission of paging messages (originated from the MME), scheduling and transmission of broadcast information (originated from the MME or O&M), and measurement and measurement reporting configuration for mobility and scheduling. The MME may host functions such as the following: distribution of paging messages to the eNBs, security control, IP header compression and encryption of user data streams, termination of U-plane packets for paging reasons; switching of U-plane for support of UE mobility, idle state mobility control, System Architecture Evolution (SAE) bearer control, and ciphering and integrity protection of NAS signaling.

In mobile telecommunications, the two basic types of power control are open-loop and closed-loop. In open-loop power control (OLPC), a mobile terminal measures received pilot signal power and accordingly sets the transmission power density (PDS) according to this measured quantity, and based on the pilot transmitted power, the S(I)NR target, and the interference level (these last values are usually broadcasted by the base station). In closed-loop power control, the measurements are done on the other end of the connection, in the base station, and the results are then sent back to the mobile terminal so that the mobile terminal can adjust its transmission power. Note that the term "base station" is used broadly in this application, and may refer to a Node B, or an eNodeB, or the like.

The current trend in the art is that uplink power control will include: (i) an open loop power control mechanism at the terminal, as well as (ii) options for the eNode-B to send closed loop power control correction commands to the terminal. The current invention solves problems that occur with uplink power control and associated signalling from the terminal to the base station (eNode-B) to facilitate efficient uplink radio resource management decisions at the eNode-B.

Given this uplink power control scheme, the eNode-B may be unaware of the transmit power level at which different terminals are operating. This information is important for the eNode-B, because this knowledge is needed for optimal radio resource management decisions such as allocating MCS (modulation and coding scheme) and transmission bandwidth for the different terminals. It therefore has been discussed in 3GPP that terminals should be able to provide power control headroom reports to the eNode-B. The power control headroom report basically provides a measure of how close the terminal's power spectral density (PSD) is to the maximum PSD limit. The maximum PSD might be derived from the maximum UE transmit power (typically assumed to be on the order of 24 dBm) and the minimum bandwidth (typically 1 PRB).

Unfortunately, 3GPP has not yet been able to find satisfactory criteria for sending a power control headroom report from the user terminal to the eNode-B. In LTE uplink (UL), the eNode-B makes the scheduling and radio resource management decisions such as selecting the UEs to transmit, allocating the UE transmission bandwidths, and (as mentioned above) selecting the MCS they should use. These decisions are then signalled to the terminal(s) via dedicated signalling (e.g. UL scheduling grant message). And, in order to make these decisions properly, the eNode-B should be aware of the power level at which the terminals are transmitting, or some equivalent information like the power headroom information, since from this information the eNodeB derives which MCS can be supported in the future with a targeted block error rate (BLER) which would be otherwise not possible. Knowing at the eNode-B the power spectral density used by the mobile terminals is particularly important when selecting the transmission bandwidth (rather than the MCS). Not knowing with precision the PSD used by a mobile terminal when selecting the MCS has only a major impact in case of slow AMC (in which case the PSD is "automatically" increased/decreased when the MCS is modified).

Consequently, reporting of power headroom or some equivalent information is needed. However, reporting of the power control headroom is a trade-off between uplink signalling overhead versus performance improvements that result from having this information readily available at the eNode-B.

It is problematic to have the terminal periodically report the power control headroom at a frequency higher than the adjustments of the actual terminal power spectral density (PSD). Further, the aim of these power adjustments at the terminal is basically to (partly or fully) compensate the path-loss (including antenna-pattern, distance dependent path-loss and shadowing) between the eNode-B and the terminal, and the measurement of path-loss is done based on the DL (e.g. DL pilot channel). Even if the frequency of potential power adjustments at the terminal is high but the measured path-loss is not changing, UL signalling would be a waste of resources; the only issue then for reporting would be if closed loop power control commands would come from the eNodeB and some of those commands would be misinterpreted at the UE. Then, the problem occurs that the eNodeB does not know the used transmission power. The problem with power control commands being misinterpreted at the mobile terminal is only an issue if relative closed loop power control commands are used (which is also the working assumption in 3GPP).

In HSUPA, the UE Power Headroom (UPH) is part of the Scheduling Information (SI), which is transmitted by the UE as part of the MAC-e header. If the UE is not allocated resources for the transmission of scheduled-data, then Scheduling Information can be transmitted periodically and/or based on specific triggers (i.e. when data arrives in the buffer). Otherwise, only periodic reporting is supported.

SUMMARY OF THE INVENTION

Although the present invention is applicable in the context of the E-UTRAN (LTE or 3.9G), its principles are not limited to such an environment, and instead may also be applicable to various other current and future wireless telecommunications systems and access technologies. This invention provides specific reporting criteria that are an attractive trade-off between signalling overhead versus overall uplink performance for LTE. The following triggering criteria are found to be very efficient for sending a power control headroom report in the uplink, while optimizing uplink performance, and while minimizing signalling overhead.

The first triggering criterion is that, once "n" closed loop power corrections have been received by a terminal (sent from the eNode-B), the power control headroom is measured by the terminal over the next "m" transmission time intervals (TTIs) and afterwards reported to the eNode-B. The reason for this first criterion is, as already mentioned above, that the closed loop commands can be misinterpreted at the terminal and therefore tracking of power status at the eNodeB would lead to the accumulation of such errors. The problem with power control commands being misinterpreted at the mobile terminal is only an issue if relative closed loop power control commands are used (which is also the working assumption in 3GPP).

The second triggering criterion is that, after the terminal's open loop power control algorithm modifies the PSD, the terminal shall measure the power control headroom over the following "m" TTIs and afterwards report it to the eNode-B.

The third triggering criterion is that, in order to further limit the signalling of uplink power control headroom reports, the terminal shall only send a new power control headroom report if the time since the last reporting exceeds "k" TTIs.

And, the fourth triggering criterion is that, instead of the third triggering criterion, another embodiment of the invention is that the terminal shall only send a new power control headroom report if the absolute difference between the current and the latest path-loss measurement is higher than a given threshold "p".

The three aforementioned quantities "n", "m", "k" (or "p" if the fourth rather than third triggering criterion is used) are parameters that are configured by the eNode-B. As an example, these parameters can be configured via RRC signalling from the eNode-B to the terminal. These described triggering criteria can be combined (e.g. using a logical "OR" combination).

DETAILED DESCRIPTION OF THE INVENTION

A preferred embodiment of the present invention will now be described. This is merely to illustrate one way of implementing the invention, without limiting the scope or coverage of what is described elsewhere in this application.

In this preferred embodiment, the reporting criteria are implemented in the terminal. However, the protocol for signalling the parameters "n", "m", "k" and/or "p" requires implementation at both the eNode-B and the terminal. This embodiment of the invention provides an attractive trade-off between signalling overhead and performance.

Figure 1:
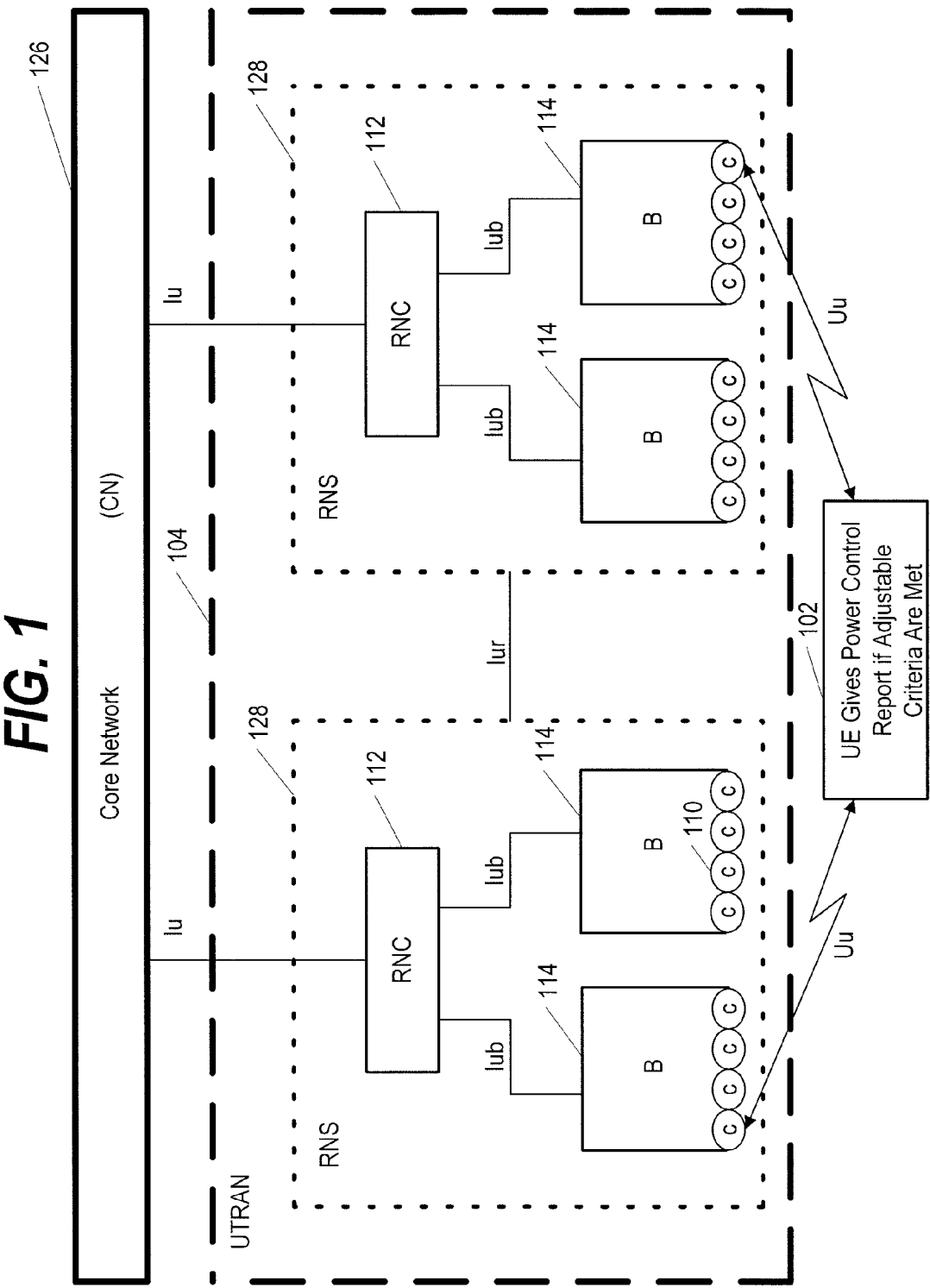
FIG. 1 shows a UTRAN network.
Figure 2:
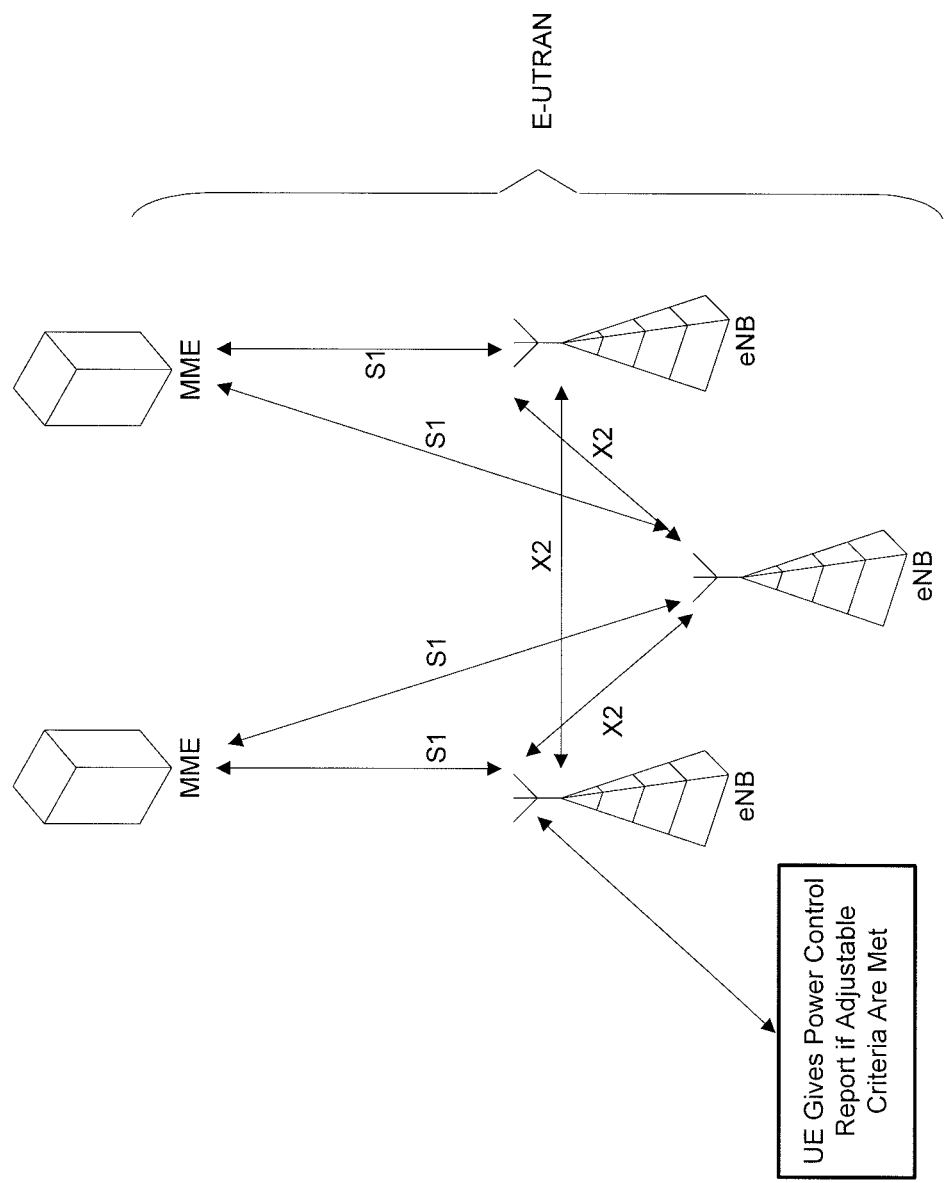
FIG. 2 shows an LTE architecture.
Figure 3:
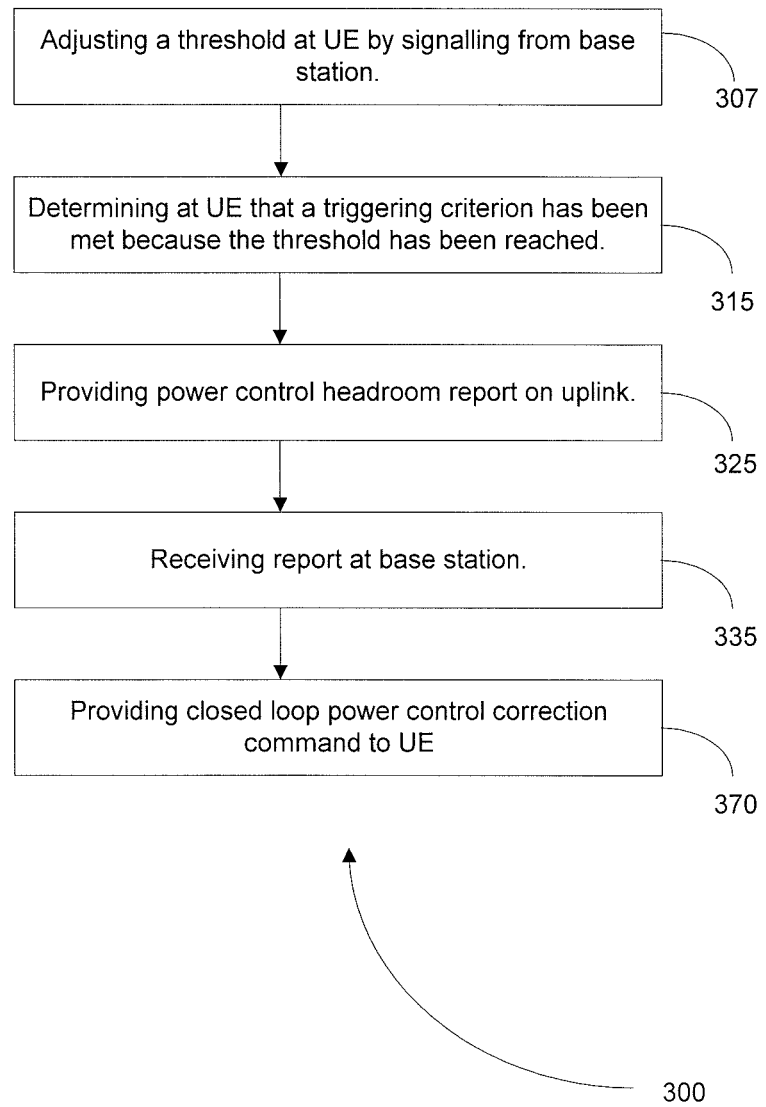
FIG. 3 is a flow chart showing and embodiment of a method according to the present invention.

As seen in FIG. 3, the method 300 can begin with the base station adjusting 307 one or more of the thresholds "n", "m", "k" and/or "p" at the user equipment (UE) by signalling to the UE. At some subsequent point in time, the UE determines 315 that a triggering criterion has been met because one of those thresholds have been reached (or some combination of those thresholds have been reached). This will trigger the UE to provide 325 a power control headroom report on the uplink. When this report is received 335 at the base station, the base station will then use that report to help provide 370 a closed loop power control correction command to the user equipment.

Figure 4:
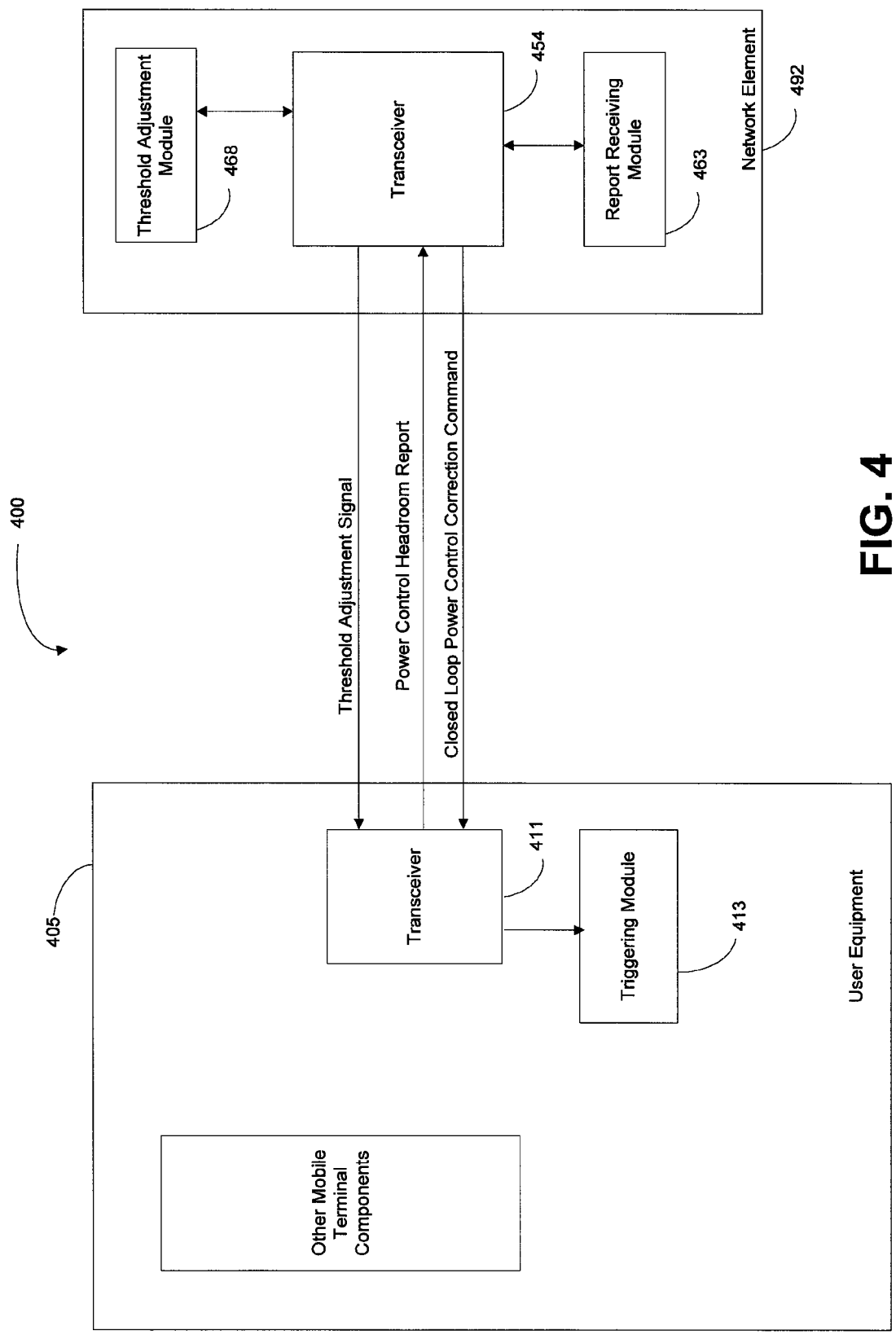
FIG. 4 is a block diagram of a system according to an embodiment of the present invention.

Referring now to FIG. 4, a system 400 is shown according to an embodiment of the invention, including a network element 492 and a user equipment 405. At the network element, a threshold adjustment module 468 instructs transceiver 454 to send a threshold adjustment signal to the user equipment. At some subsequent point, a triggering module 413 at the user equipment determines that the threshold has been reached, and therefore instructs transceiver 411 to provide a power control headroom report to the network element, which processes the report in a report receiving module 463. The report receiving module 463 will thereby help the network element to provide a closed loop power control correction command to the user equipment 405.

Each of the embodiments described above can be implemented using a general purpose or specific-use computer system, with standard operating system software conforming to the method described herein. The software is designed to drive the operation of the particular hardware of the system, and will be compatible with other system components and I/O controllers. The computer system of this embodiment includes a CPU processor, comprising a single processing unit, multiple processing units capable of parallel operation, or the CPU can be distributed across one or more processing units in one or more locations, e.g., on a client and server. A memory may comprise any known type of data storage and/or transmission media, including magnetic media, optical media, random access memory (RAM), read-only memory (ROM), a data cache, a data object, etc. Moreover, similar to the CPU, the memory may reside at a single physical location, comprising one or more types of data storage, or be distributed across a plurality of physical systems in various forms.

It is to be understood that the present figures, and the accompanying narrative discussions of best mode embodiments, do not purport to be completely rigorous treatments of the method, system, mobile device, network element, and software product under consideration. A person skilled in the art will understand that the steps and signals of the present application represent general cause-and-effect relationships that do not exclude intermediate interactions of various types, and will further understand that the various steps and structures described in this application can be implemented by a variety of different sequences and configurations, using various different combinations of hardware and software which need not be further detailed herein.

The invention includes a variety of concepts, which can be briefly described as follows, without in any way limiting what will be claimed in the future in reliance upon this provisional application. It is to be understood that the following concepts can be further combined with each other in any multiple dependent manner, without departing from the scope of the invention.

The invention claimed is:

1. A method comprising:
    determining that a set of at east one triggering criterion is met; and
    providing a power control headroom report on an uplink from user equipment, in response to determining that the set is met, wherein said at least one triggering criterion include at least one threshold having been reached, wherein said at least one threshold is adjustable via a signal to the user equipment, wherein the set of at least one triggering criterion comprises a criterion being met based on reaching a threshold of the at least one threshold of k transmission time intervals following a previous power control headroom report, wherein k is an integer and wherein said at least one threshold adjustable via the signal comprises adjusting the threshold integer k.

2. The method of claim 1, wherein said power control headroom report is for use in a power control correction command to the user equipment.

3. The method of claim 1, wherein the set of at least one triggering criterion comprises a triggering criterion such that an absolute difference between current and most recent path-loss measurements has reached a threshold of difference.

4. The method of claim 1, wherein said set of at least one triggering criterion include any one of a plurality of criteria that each entail teaching a respective threshold.

5. The method of claim 1, wherein the set of at least one triggering criterion comprise a first criterion, a second criterion, and a third criterion.

6. The method of claim 5, wherein the first criterion is such that a number of received closed loop power corrections has reached a threshold of corrections, and wherein the second criterion is such that an amount of transmission time intervals following an open loop power control modification has reached a threshold of intervals since modification.

7. The method of claim 6, wherein the third criterion is such that an amount of transmission time intervals following a previous power control headroom report has reached a threshold of intervals since reporting.

8. The method of claim 6, wherein the third criterion is such that an absolute difference between current and most recent path-loss measurements has reached a threshold of difference.

9. The method of claim 1, wherein the set of at least one triggering criterion comprises a criterion being met based on reaching a threshold of the at least one threshold of n closed loop power corrections having been received by the user equipment over m transmission time intervals, wherein n and m are integers and wherein said at least one threshold adjustable via the signal comprises adjusting the threshold integers n and m.

10. The method of claim 1, wherein the set of at least one triggering criterion comprises a criterion being met based on reaching a threshold of the at least one threshold of m transmission time intervals, following an open loop power control modification, wherein m is an integer and wherein said at least one threshold adjustable via the signal comprises adjusting the threshold integer m.

11. An apparatus comprising:
means for determining that a set of at least one triggering criterion is met; and
means for providing a power control headroom report on an uplink from user equipment, in response to the set having been met, wherein said at least one triggering criterion include at least one threshold having been reached power correction, wherein said at least one threshold is adjustable via a signal to the apparatus, wherein the set of at least one triggering criterion comprises a criterion being met based on reaching a threshold of the at least one threshold of k transmission time intervals following a previous power control headroom report, wherein k is an integer and wherein said at least one threshold adjustable via the signal comprises adjusting the threshold integer k.

12. The apparatus of claim 11, wherein said power control headroom report is for use in a power control correction command to the apparatus.

13. The apparatus of claim 11, wherein the set of at least one triggering criterion comprises a criterion such that an absolute difference between current and most recent path-loss measurements has reached a threshold of difference.

14. The apparatus of claim 11, wherein said set of at least one triggering criterion include any one of a plurality of criteria that each entail reaching a respective threshold.

15. The apparatus of claim 11, wherein the set of at least one triggering criteria comprise a first criterion, a second criterion, and a third criterion.

16. The apparatus of claim 15, wherein the first criterion is such that a number of received closed loop power corrections has reached a threshold of corrections, and wherein the second criterion is such that an amount of transmission time intervals following an open loop power control modification has reached a threshold of intervals since modification.

17. The apparatus of claim 16, wherein the third criterion is such that an amount of transmission time intervals following a previous power control headroom report has reached a threshold of intervals since reporting.

18. The apparatus of claim 16, wherein the third criterion is such that an absolute difference between current and most recent path-loss measurements has reached a threshold of difference.

19. An apparatus comprising:
at least one processor; and
at least one memory including software, where the at least one memory and the software are configured, with the at least one processor, to cause the apparatus to at least:
determine that a set of at least one triggering criterion is met; and
provide a power control headroom report on an uplink from user equipment, in response to the set having been met, wherein said at least one triggering criterion include at least one threshold having been reached, wherein said at least one threshold is adjustable via a signal to the apparatus, wherein the set of at least one triggering criterion comprises a criterion being met based on reaching a threshold of the at least one threshold of k transmission time intervals following a previous power control headroom report, wherein k is an integer and wherein said at least one threshold adjustable via the signal comprises adjusting the threshold integer k.

20. The apparatus of claim 19, wherein said power control headroom report is for use in a power control correction command to the apparatus.

21. The apparatus of claim 19, wherein the set of at least one triggering criteria comprises a triggering criterion such that an absolute difference between current and most recent path-loss measurements has reached a threshold of difference.

22. The apparatus of claim 19, wherein said set of at least one triggering criterion include any one of a plurality of criteria that each entail reaching a respective threshold.

23. The apparatus of claim 22, wherein the plurality of criteria comprise a first criterion, a second criterion, and a third criterion.

24. The apparatus of claim 23, wherein the first criterion is such that a number of received closed loop power corrections has reached a threshold of corrections, and wherein the second criterion is such that an amount of transmission time intervals, following an open loop power control modification, has reached a threshold of intervals since modification.

25. The apparatus of claim 23, wherein the second criterion is such that an amount of transmission time intervals following a previous power control headroom report has reached a threshold of intervals since reporting.

26. The apparatus of claim 23, wherein the third criterion is such that an absolute difference between current and most recent path-loss measurements has reached a threshold of difference.

27. A non-transitory computer readable medium including software that when executed by a processor, is adapted to carry out functions of:
determining that a set of at least one triggering criterion is met; and
providing a power control headroom report on an uplink from user equipment, in response to the set having been met, wherein said at least one triggering criterion include at least one threshold having been reached, wherein said at least one threshold is adjustable via a signal to the user equipment, wherein the set of at least one triggering criterion comprises a criterion being met based on reaching a threshold of the at least one threshold of k transmission time intervals following a previous power control headroom report, wherein k is an integer and wherein said at least one threshold adjustable via the signal comprises adjusting the threshold integer k.

28. The computer readable medium of claim 27, wherein said power control headroom report is for use in a power control correction command to the user equipment.

29. The computer readable medium of claim 27, wherein the set comprises a criterion such that an absolute difference between current and most recent path-loss measurements has reached a threshold of difference.

30. The computer readable medium of claim 27, wherein said set of at least one triggering criterion include any one of a plurality of criteria that each entail reaching a respective threshold.

31. The computer readable medium of claim 30, wherein the plurality of criteria comprise a first criterion, a second criterion, and a third criterion.

32. The computer readable medium of claim 31, wherein the first criterion is such that a number of received closed loop power corrections has reached a threshold of corrections, and wherein the second criterion is such that an amount of transmission time intervals, following an open loop power control modification, has reached a threshold of intervals since modification.

33. A network element comprising:
   at least one processor; and
   at least one memory including software, where the at least one memory and the software are configured, with the at least one processor, to cause the network element to at least:
   receive a power control headroom report on an uplink from user equipment, in response to the user equipment determining that a set of at least one triggering criterion is met because at least one threshold has been reached, wherein the set of at least one triggering criterion comprises a criterion being met based on reaching a threshold of the at least one threshold of k transmission time intervals following a previous power control headroom report, wherein k is an integer and wherein said at least one threshold adjustable via the signal comprises adjusting the threshold integer k; and
   provide a threshold adjustment signal to the user equipment in order to adjust the at least one threshold.

34. The network element of claim 33, wherein the set comprises a criterion such that an absolute difference between current and most recent path-loss measurements has reached a threshold of difference.

35. The network element of claim 33, wherein the at least one memory including the software is configured with the at least one processor to cause the network element to provide a closed loop power control correction command signal to the user equipment at least partly in response to said power control headroom report.

* * * * *

UNITED STATES PATENT AND TRADEMARK OFFICE
CERTIFICATE OF CORRECTION

PATENT NO.          : 8,457,676 B2
APPLICATION NO.     : 12/665427
DATED               : June 4, 2013
INVENTOR(S)         : Juergen Michel et al.

Page 1 of 1

It is certified that error appears in the above-identified patent and that said Letters Patent is hereby corrected as shown below:

In the Claims

Column 9, line 20 thru Column 10, line 7
Strike the phrase ", wherein the set of at least one triggering criterion comprises a criterion being met based on reaching a threshold of the at least one threshold of k transmission time intervals following a previous power control headroom report, wherein k is an integer and wherein said at least one threshold adjustable via the signal comprises adjusting the threshold integer k" from lines 10-17 of claim 33, and insert the phrase --; wherein the set of at least one triggering criterion comprises a criterion being met based on reaching a threshold of the at least one threshold of k transmission time intervals following a previous power control headroom report, wherein k is an integer and wherein said at least one threshold adjustable via the signal comprises adjusting the threshold integer k-- after the phrase "provide a threshold adjustment signal to the user equipment in order to adjust the at least one threshold" at line 19 of claim 33.

Signed and Sealed this
Seventh Day of July, 2015

Michelle K. Lee
*Director of the United States Patent and Trademark Office*